(12) United States Patent
Piazza

(10) Patent No.: US 7,178,141 B2
(45) Date of Patent: Feb. 13, 2007

(54) METHOD AND SYSTEM FOR IDENTIFYING COMPATIBILITY BETWEEN FIRMWARE IMAGES

(75) Inventor: William Joseph Piazza, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 925 days.

(21) Appl. No.: 09/918,132

(22) Filed: Jul. 30, 2001

(65) Prior Publication Data

US 2004/0205745 A1 Oct. 14, 2004

(51) Int. Cl.
*G06F 9/44* (2006.01)
*G06F 3/00* (2006.01)

(52) U.S. Cl. ............ 717/168; 717/169; 717/170; 719/321

(58) Field of Classification Search ......... 717/168, 717/169, 170; 719/321
See application file for complete search history.

(56) References Cited

U.S. PATENT DOCUMENTS

| 5,579,509 | A | * | 11/1996 | Furtney et al. ............ 717/170 |
| 5,802,365 | A | * | 9/1998 | Kathail et al. ............ 719/321 |
| 5,826,075 | A | | 10/1998 | Bealkowski et al. |
| 5,878,256 | A | * | 3/1999 | Bealkowski et al. ........ 717/168 |
| 5,933,652 | A | * | 8/1999 | Chen et al. .................... 710/1 |
| 6,023,727 | A | | 2/2000 | Barrett et al. |
| 6,041,364 | A | * | 3/2000 | Lortz et al. ................. 719/321 |
| 6,138,178 | A | * | 10/2000 | Watanabe ...................... 710/8 |
| 6,314,330 | B1 | * | 11/2001 | Matthews ..................... 700/94 |
| 6,360,362 | B1 | * | 3/2002 | Fichtner et al. ............. 717/168 |
| 6,473,899 | B1 | * | 10/2002 | Nelson et al. .............. 717/173 |
| 6,513,159 | B1 | * | 1/2003 | Dodson ....................... 717/178 |
| 6,581,157 | B1 | * | 6/2003 | Chiles et al. .................. 713/1 |

* cited by examiner

*Primary Examiner*—Wei Zhen
*Assistant Examiner*—Qamrun Nahar
(74) *Attorney, Agent, or Firm*—Cynthia S. Byrd; Dillon & Yudell LLP

(57) ABSTRACT

A method and system for identifying compatibility between firmware images. The method for identifying compatibility between firmware images includes analyzing a control block of each of the firmware images, where each of the control blocks includes a firmware family code and a compatibility table of a firmware image associated with the control block. Next, the method determines if the firmware family codes of the firmware images are the same and whether any of the compatibility table entries pertain to either firmware image. Generally, if the firmware family codes are the same, the firmware images are considered compatible, however, if the firmware family codes are different, the firmware images are considered to be incompatible, unless a compatibility table entry indicates otherwise.

18 Claims, 4 Drawing Sheets

| OFFSET | NAME | LENGTH | VALUE | DESCRIPTION | |
|---|---|---|---|---|---|
| 00h | Identifier | 4 bytes | 'FFCB' | Character string marks start of control block | 210 |
| 04h | Present Firmware Family Code | 1 word | Varies | Architecturally assigned family code which this image belongs to | 220 |
| 06h | Present Firmware Stepping Level | 1 byte | Varies | Stepping level automatically incremented by one for each new build | 230 |
| 07h | First table entry | 4 bytes | Varies | First compatibility table entry (optional) | 240 |
| 0Bh | Second table entry | 4 bytes | Varies | Second compatibility table entry (optional) | 250 |
| ⋮ | ⋮ | ⋮ | ⋮ | ⋮ | |
| 03h + 4*N | Nth table entry | 4 bytes | Varies | Nth compatibility table entry (optional) | 260 |
| 07h + 4*N | End of table marker | 4 bytes | 00h 00h 00h 00h | Table entry of all 0's marks end of table | 270 |

*Fig. 2*

| OFFSET | NAME | LENGTH | VALUE | DESCRIPTION |
|---|---|---|---|---|
| 00h | Relationship Code | 1 byte | Varies | Code describing relationship between the present image and other images which may be compared to it |
| 01h | Comparison Firmware Family Code | 1 word | Varies (0001h or larger) | Firmware family code of another image which may be compared to the present image |
| 03h | Comparison Firmware Stepping Level | 1 byte | Varies (01h or larger) | Firmware stepping level of another image which may be compatible to the present image |

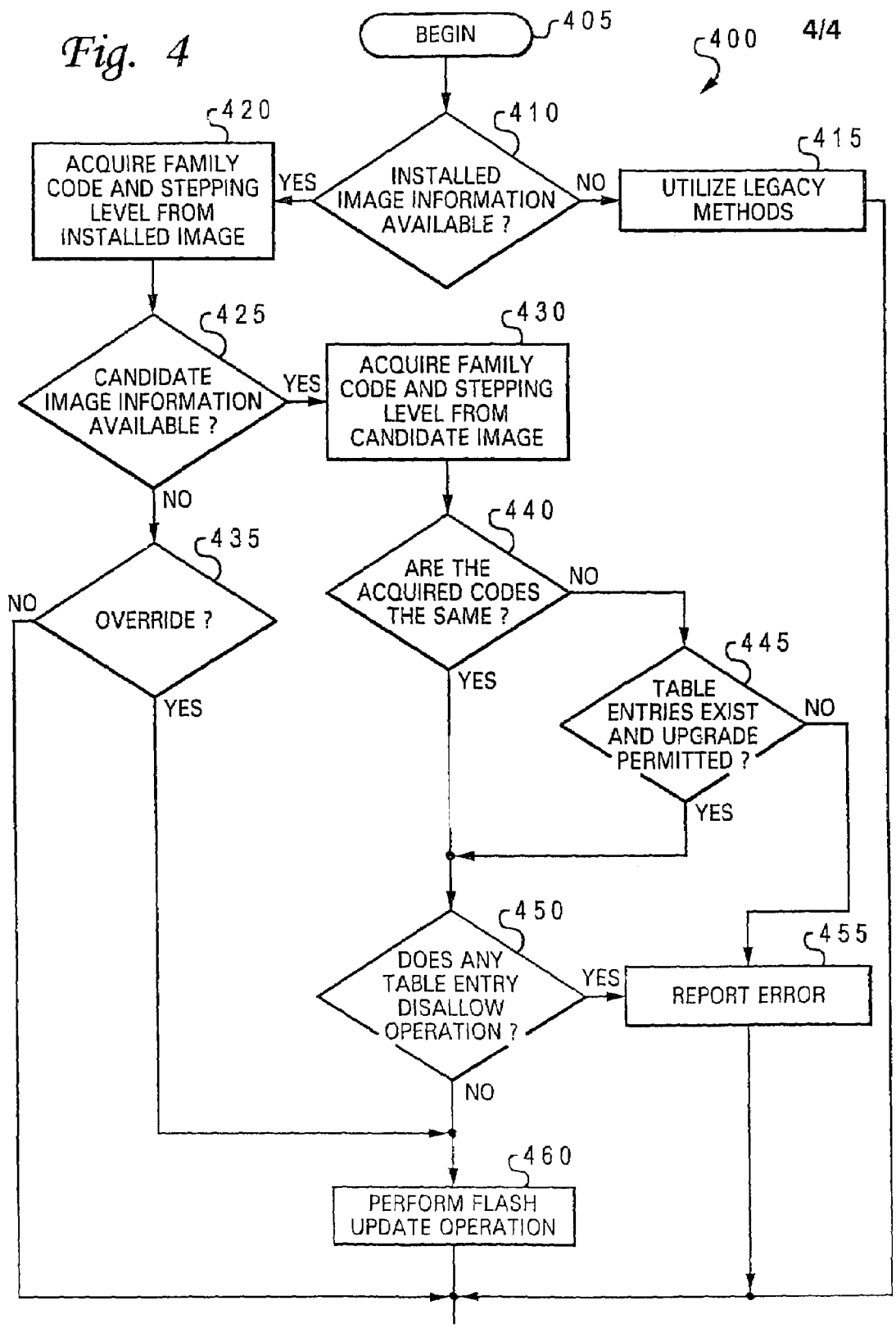

METHOD AND SYSTEM FOR IDENTIFYING COMPATIBILITY BETWEEN FIRMWARE IMAGES

BACKGROUND OF THE INVENTION

1. Technical Field

The present invention relates in general to firmware for systems and electronic devices and, in particular, to firmware upgrades. More particularly, the present invention relates to a method for identifying if a candidate firmware is compatible with an existing, or installed, firmware installation.

2. Description of the Related Art

Firmware is software codes which reside in a piece of hardware and are responsible for an integral portion of the hardware function and are generally treated as being a component of the hardware. Typically, firmware is stored as binary information in some form of nonvolatile memory component, in which binary can be represented in hexadecimal, octal and other number bases. The components of firmware may be executable programs, such as power-on self test (POST), Basic Input/Output Software (BIOS), configuration utilities, etc., or it may be data tables, e.g., a description of the geometry of a hardfile, register values to use with a universal asynchronous receiver-transmitter (UART) to produce different baud rates, etc. Firmware is typically stored in a special type of memory chip that doesn't lose its storage capabilities when power is removed or lost. This non-volatile memory is classified as "read-only" memory (ROM) because the user, during normal operation, cannot change the information stored there. Generally, ROMs are programmed at the "factory", i.e., by the ROM manufacturer utilizing information provided by a customer. A basic type of memory device utilized to store firmware is called a programmable read only memory (PROM), which is programmable by any technician utilizing, e.g., a programming console. A basic PROM receives one version of firmware and the firmware code is "burned in" to the PROM and cannot be changed. To update the firmware, the PROM must be physically removed from the device and replaced with a new PROM that contains the upgraded firmware. Improvements in memory device technologies have rendered variations of the PROM, such as erasable programmable read only memory (EPROM) and electrically erasable programmable read only memory (EEPROM) devices, that can be erased utilizing electrical signals without the need to remove them from a circuit.

All products generally experience a number of firmware revisions that correct firmware defects, compensate for hardware or operating system errors or introduce new features. As long as the hardware architecture of the subsystem does not change substantially and each new firmware revision is capable of recognizing and dealing with differences in hardware revisions levels, things are relatively simple for the flash utility that replaces the present installed firmware image with a upgrade firmware image. The flash utility may assume that the progression of build IDs, such as QYKT24AUS, QYKT25AUS, etc., is valid and that older revisions may be applied over newer revisions, i.e., the level of the flash may regress, albeit with the possible loss of function and re-introduction of firmware defects.

However, certain events in the life-cycle of a product family break these simple assumptions. These events may include:

(1) Major changes in the architecture of a product, e.g., as a result of cost reduction changes, such that older versions of firmware do not recognize newer hardware features and therefore treat them improperly.

(2) The divergence of a product family into 2 or more related families, possibly under the control of two different engineering teams located, e.g., in distant cities, where the firmware may look similar but has actually been customized for a specific set of hardware.

(3) The convergence of two product families (from a firmware perspective). Convergence can be used as a cost reduction tool where two similar pieces of firmware exist and can be combined into a single firmware image that works on both hardware platforms but requires only a single development group to maintain and test it.

(4) A characteristic of a product, e.g., the layout of configuration information in CMOS memory, changes in such a way that older levels of firmware would misinterpret it.

Generally, systems and subsystems with updateable firmware typically require some sort of verification to determine applicability of a candidate image to an existing installation. Conventional methods quite often amount to nothing more than verifying some or all of the following: (i) a company's copyright notice exists in the candidate image; (ii) a part number in a recognizable form and position exists in the candidate image; (iii) a "type code" exists in the candidate image in a recognizable form and position and the type code indicates that the old and new images are compatible (type codes identify compatible types of hardware and may be applied to the overall product or to subsystems within the product); (iv) a revision level exists in the candidate image and that the user is attempting to apply a newer image over an older image; and (v) the candidate image has not been corrupted, e.g., verified by using a checksum or CRC. Items (i), (ii), and (iv) above do little (if anything) to aid in verifying compatibility between firmware images. They allow software utilities to verify that the firmware images came from a single vendor and that the user is not attempting to regress to an older firmware image. Even then, there are times when it may be desirable to regress so that a warning with a mechanism to override the protection is usually provided.

The limitations in the prior art generally centers on the use of type codes to indicate compatibility between images. The conventional techniques either do not utilize such type codes, in which case it is possible to inadvertently apply the wrong type of firmware image to a product, or assume that only firmware images within the same type code are compatible. Additionally, conventional techniques commonly require that an exact match exist between a single type code in the candidate image and a single type code in the installed image. Furthermore, the prior art techniques may also commonly assume that any new firmware images that present the same type code as an installed firmware image is compatible and may be utilized to update the installed image. These "simple" schemes often cause problems in the real world where complicated scenarios may arise. For example, these simple schemes are unable to deal with the following scenarios:

(a) A new component is introduced into a product line and requires new firmware to support it. The new firmware image will also work on older hardware but firmware images intended for the older hardware will not work (and should therefore not be allowed to update) on the newer hardware.

(b) For cost reduction reasons, two existing (and similar) firmware images (intended for slightly different hardware platforms) are combined into a single firmware image which will work on either of the hardware platforms.

(c) The firmware associated with a piece of hardware must be updated to one specific firmware image, which re-initializes some CMOS data areas, before other firmware updates may be applied to the hardware.

(d) The firmware associated with a piece of hardware must not be allowed to regress beyond a certain previous revision level because, e.g., the organization of CMOS memory utilized by certain previous revisions is incompatible with the present organization of CMOS memory.

Accordingly, what is needed in the art is an improved method of upgrading the existing firmware that mitigates the limitations discussed above. More particularly, what is needed in the art is a method for identifying if a firmware upgrade candidate image is compatible with the existing firmware image.

SUMMARY OF THE INVENTION

To address the above-discussed deficiencies of the prior art, the present invention provides a method and system for identifying compatibility between firmware images is disclosed. In one embodiment, the method for identifying compatibility between firmware images includes analyzing a control block of each of the firmware images, where each of the control blocks includes a firmware family code and a compatibility table of a firmware image associated with the control block. Next, the method determines if the firmware family codes of the firmware images are the same and whether any of the compatibility table entries pertain to either firmware image. Generally, if the firmware family codes are the same, the firmware images are considered compatible, however, if the firmware family codes are different, the firmware images are considered to be incompatible, unless a compatibility table entry indicates otherwise.

The present invention discloses a novel "firmware family control block" and a method for deciding, based upon the information contained in the firmware family control blocks, whether a candidate firmware image may be utilized to update an installed firmware image. The firmware family control block disclosed by the present invention includes a firmware family code and revision code pertaining to the firmware image associated with the firmware family control block. Additionally, the firmware family control block also includes a compatibility table that describes whether the firmware image may be utilized to update, or may be updated by, firmware images representing different family codes and revision levels.

The foregoing description has outlined, rather broadly, preferred and alternative features of the present invention so that those skilled in the art may better understand the detailed description of the invention that follows. Additional features of the invention will be described hereinafter that form the subject matter of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 illustrates an embodiment of a firmware family control block according to the principles disclosed by the present invention;

FIG. 3 illustrates an embodiment of a table entry in a firmware compatibility table according to the principles disclosed by the present invention; and FIG. 4 illustrates a high-level process flow of an embodiment of a firmware upgrade process according to the present invention.

DESCRIPTION OF THE PREFERRED EMBODIMENT

Figure 1:
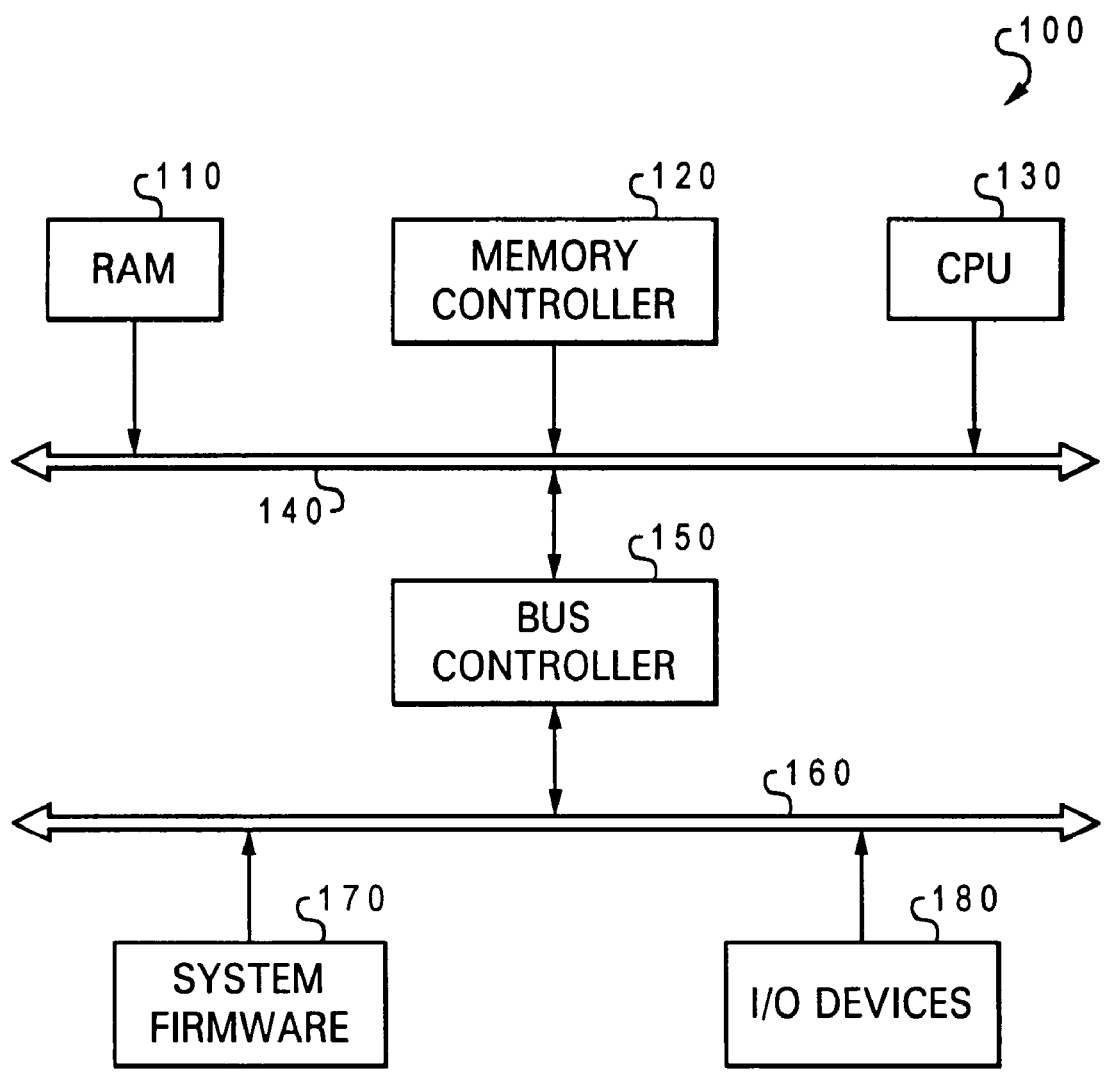
FIG. 1 illustrates a simplified high-level block diagram of an exemplary data processing system that provides a suitable environment for the practice of the present invention.

With reference now to the figures and in particular with reference to FIG. 1, there is depicted a simplified high-level block diagram of an exemplary data processing system 100 that provides a suitable environment for the practice of the present invention. As shown in the illustrated embodiment, data processing system 100, e.g., a personal computer, includes a random access memory (RAM) 110, memory controller 120 and a central processing unit (CPU) 130 that are interconnected utilizing a system bus 140. A bus controller 150 provides a means for arbitrating the data flow between system bus 140 and a input/output bus 160. Data processing system 100 also includes a plurality of I/O devices, generally designated 180, such as disk drives and network cards, and a system firmware 170 that is typically resident in a read only memory (ROM) device, such as an electrically erasable programmable read only memory (EEPROM). It should be noted that although data processing system 100 has been described in the context of a computer system, the present invention does not contemplate limiting its practice to this one particular embodiment. The present invention may be advantageously practiced in any system and/or device, such as ethernet cards, that utilizes firmware in its setup and operational phases.

Referring now to FIG. 2, there is illustrated an embodiment of a firmware family control block 200 according to the principles disclosed by the present invention. Firmware family control block 200 is typically part of a firmware image (analogous to system firmware 170 in FIG. 1) that in, an advantageous embodiment, is resident in a non-volatile read only memory (ROM) memory device, such as an EEPROM, of a system or peripheral device. Alternatively, in other advantageous embodiments, firmware family control block 200 may be resident in the system's non-volatile memory, such as a disk drive, and may be made available via a software application program interface (API). The firmware family control block 200 can be read directly from either the flash memory device or through a software API. In either case, firmware family control block is available to the "Flash" utilities from the installed Flash image residing, e.g., on a hardware subsystem, and from new firmware images not yet installed on a system. In another advantageous embodiment, firmware family control block 200 may be implemented as an original equipment manufacturer (OEM) "SMBIOS" structure. Firmware family control block 200 incorporates a data structure that includes an identifier 210 field that provides a means for allowing firmware family control block 200 to be identified by flash utilities that generally scan memory locations. Identifier 210, in an advantageous embodiment, is a character string, e.g., FFCB, that marks the beginning of firmware family control block 200. A present firmware family code 220 field is included in firmware family control block 200 to uniquely identify the product family of the device and, in an advantageous embodiment, is an architecturally controlled 16 bit value. A product family is defined within the context of the present invention as a set, or group, of products that utilizes the same firmware and which generally allows unrestricted changes from one revision level of the firmware to another revision level. It should be noted that, in an advantageous embodiment, any given firmware image may only belong to one product family. In a preferred embodiment, the family code "0" is reserved and a reference to a family code 0 in a compatibility table that will described in greater detail hereinafter indicates that the firmware image's associated device is a "legacy" subsystem that does not utilize or implements family codes. Generally, new revisions of a product's firmware will typically utilize the same family code, but the firmware stepping level of the firmware may be incremented, typically by one.

Firmware family control block 200 also includes a present firmware stepping, or revision, level 230 field that contains data representing the current stepping level of the firmware image. In a preferred embodiment, the firmware stepping level is a 8 bit value that is incremented each time a new flash firmware image is built, analogous to a software program revision code. A firmware stepping level of "0," in an advantageous embodiment, is reserved and a reference to a firmware stepping level 0 in a compatibility table indicates "any firmware stepping level." It should be noted that within a firmware family code, a higher value of the firmware stepping level implies, in an advantageous embodiment, a newer version of the firmware image. However, it should be readily apparent to those skilled in the art that any tracking scheme may also be advantageously employed.

A firmware compatibility table is utilized by firmware family control block 200 to describe the relationship between the instance of the present firmware, i.e., the firmware image that contains the firmware compatibility table, and other firmware images which may have a significance during a firmware flash, e.g., upgrade, operation. As depicted in the illustrated embodiment, the firmware compatibility table includes first, second and Nth table entries 240, 250, 260, respectively. Each of the table entries in the firmware compatibility tables corresponds to a different firmware image having another firmware family code and/or firmware stepping level. In a preferred embodiment, the firmware compatibility table is a data structure implemented utilizing well-known techniques in the art, where each table entry, i.e., first, second or Nth table entries 240, 250, 260, includes a firmware family code, a firmware stepping level and a relationship code. To denote the end of the firmware compatibility table, an end of table marker 270 is utilized where a table entry of 0's is entered for the firmware family code, firmware stepping level and relationship code. An illustrative table entry in the firmware compatibility table will be described in greater detail hereinafter with reference to FIG. 3, with continuing reference to FIG. 2.

Turning now to FIG. 3, there is depicted an embodiment of a table entry 300 in a firmware compatibility table according to the principles disclosed by the present invention. As shown in the illustrated embodiment, table entry 300, analogous to first, second or Nth table entries 240, 250, 260, includes relationship code 310, comparison firmware family code 320 and comparison firmware stepping level 330 fields. The relationship code, in an advantageous embodiment, is a 8 bit value that identifies whether the present firmware image, i.e., firmware that the compatibility table is part of, can be utilized to replace firmware belonging to a firmware family identified in the compatibility table. In addition, the relationship code can also be utilized to determine if the present firmware image is allowed to be replaced by the firmware family identified in the compatibility table. An exemplary embodiment of a relationship code is depicted below in Table 1.

TABLE 1

| Relationship Code | |
|---|---|
| Bits 7–5 | Family Relationship code |
| Bit 4 | Reserved |
| Bit 3 | Reserved |
| Bit 2 | Reserved |
| Bit 1–0 | Stepping Level Relationship Code |

As shown above in Table 1, the relationship code comprises a 3 bit family relationship field and a 2 bit stepping level relationship field 1. It should be noted that reserved bits are zero. The relationship code also conveys information regarding the firmware stepping levels involved, specifically, whether any firmware replacement operation may be permitted for any stepping level, specific stepping levels, all newer stepping levels or all older stepping levels. Furthermore, the relationship code may also be utilized to identify certain particular firmware family codes or stepping levels that the present firmware image is not allowed to replace, or alternatively, be replaced with. Exemplary embodiments of family relationships and stepping level relationships are illustrated below in Tables 2 and 3, respectively.

TABLE 2

| Family Relationship | | |
|---|---|---|
| FAMILY RELATIONSHIP CODE | RELATIONSHIP NAME | DESCRIPTION |
| 00h | Unused | Appears in 'end of table' |
| 01h | REPLACES | The present firmware image can replace the firmware revision described in the compatibility table entry |
| 02h | IS_REPLACED_BY | The firmware revision described in the compatibility table can be used to replace the present firmware image |
| 03h | INCOMPATIBLE_WITH | The firmware revision described in the table is incompatible with the present firmware image and therefore cannot be used to replace the present firmware image |
| 04h | Reserved | |
| 05h | Reserved | |
| 06h | Reserved | |
| 07h | Reserved | |

As detailed above in Table 2, there are three situations defined by the identifiers REPLACES, IS_REPLACED_BY and INCOMPATIBLE_WITH. It should be noted that the present invention does not contemplate limiting its practice to the above three defined situations, the reserved fields may be advantageously utilized to cover other situations that may arise in the future.

TABLE 3

Stepping Level Relationship

| STEPPING LEVEL RELATIONSHIP CODE | RELATIONSHIP NAME | DESCRIPTION |
| --- | --- | --- |
| 00h | ONLY | The compatibility table entry applies only to firmware that matches exactly the family code and stepping level stated in the table entry |
| 01h | OR_PRIOR | The compatibility table entry applies to firmware that matches the family code and stepping level stated in the table entry and also to all prior stepping levels in the same family |
| 02h | OR_LATER | The compatibility table entry applies to firmware that matches the family code and stepping level stated in the table entry and also to all later stepping levels in the same family |
| 03h | ANY | The compatibility table entry applies to firmware that matches the family code stated in the table entry regardless of the stepping level |

Firmware family control block 200 is generally created utilizing conventional techniques, such as data statements, macros and/or preprocessor directives. For example, the following pseudo code detailed below in Table 4 utilizes macros named REPLACES, IS_REPLACED_BY and INCOMPATIBLE_WITH, along with defines for ONLY, OR_LATER, OR_PRIOR and ANY to create firmware family control block 200. It should be noted that the following illustration for creating a firmware family control block is generally more complicated than a typical creation of a firmware family control block would be, however, it does illustrate fairly well how the different parts of the firmware family control block are created.

TABLE 4

Pseudo code for creating a firmware family control block

```
;--------------------------------------
;Firmware Family Control Block
;--------------------------------------
Identifier      DB    'FFCB'
;The present firmware family code and present firmware stepping level are
;set by the build system. The build system created present.asm prior to
;processing this file. Present.asm contains (for example):
;
;               DW    0027h          ;Present firmware family code
;               DB    05             ;Present firmware stepping level
;
;The present firmware stepping level was just incremented by the
; build system.
INCLUDE         PRESENT.ASM
ENTRY_1         REPLACES( 0026h, 15, OR_      ;FC 26h, SL 15 or
                LATER)                         later
ENTRY_2         REPLACES( 0026h, 10, ONLY)    ;FC 26h, SL 10 only
ENTRY_3         REPLACES( 0023h, 0, ANY)      ;Any SL of FC 23h
ENTRY_4         IS_REPLACED_BY(0024h, 17,     ;FC 24h, SL 17 only
                ONLY)
ENTRY_5         INCOMPATIBLE_WITH( 0026h, 20, ONLY)
END_TABLE       DB    00h                     ; Table entry which is all zero
                DW    0000h
                DB    00h
```

The pseudo code listed in Table 4 is the equivalent of the following entries in a firmware family control block:

```
DB    46h, 46h, 43h, 42h    ;'FFCB'
DW    0027h                 ;present firmware family code
DB    05h                   ;present firmware stepping level
DB    22h                   ;1st entry REPLACES/OR_LATER
DW    0026h
DB    0Fh
DB    20h                   ;2nd entry - REPLACES/ONLY
DW    0026h
DB    0Ah
DB    23h                   ;3rd entry - REPLACES/ANY
DW    0023h
DB    00h
DB    40h                   ;4th entry- IS_REPLACED_BY/ONLY
DW    0024h
DB    11h
DB    60h                   ;5th entry -
                            NCOMPATIBLE_WITH/ONLY
DW    0026h
DB    14h
DB    00h                   ;End of table entry - all 0's
DW    0000h
DB    00h
```

The pseudo code listed in Table 4 and its equivalent firmware family control block entries above states that the present firmware image, i.e., the firmware containing the firmware family control block, belongs to firmware family 27*h* and is the 5th stepping level built in that family. It is possible that some or all of the previous revisions of the firmware were never released by development. This firmware image can be utilized to update any revision in firmware family 27*h* (implicit), firmware family 23*h* and any revision level in family 26*h* above stepping level 9, except for stepping levels 11, 12, 13, 14, and 20. Furthermore, this firmware image (once installed) can be updated by stepping level 17 in firmware family 24*h*, even though it was not known that this would be possible at the time stepping level 17 of family 24*h* was released.

Referring now to FIG. 4, there is illustrated a high-level process flow of an embodiment of a firmware upgrade process 400 according to the present invention. Process 400 is initiated, as depicted in step 405, for example, an administrator or servicer has decided to upgrade the firmware to a new level and has invoked a flash-upgrade utility and made a new flash image available to the program. Upgrading firmware may result when a device, such as a service processor, has undergone a design upgrade incorporating new components and/or additional functionality or from a desire to fix a software defect in a current release of the firmware or the release of a new software feature. In this case, the installed, or present, firmware resident on the device will also have to be revised to accommodate the new design configuration and/or software features. For ease of explanation, it is assumed that the device firmware is located in a flash memory device, such as a EEPROM, and that the replacement/upgrade process utilizes a conventional flash utility that is well-known in the art. Following initiation, process 400 determines if the device has a firmware family control block, as illustrated in decisional step 410, generally utilizing conventional utilities that scan memory for a firmware family control block identifier (identifier 210 in FIG. 2). If it is determined that the installed firmware does not have a firmware family control block, process 400 proceeds to utilize legacy methods for determining compatibility as depicted in step 415. These legacy methods may include comparing the firmware build identification (ID) or looking for some other special marker in the firmware image. In some cases, the legacy method employed may allow the firmware update without any evaluation of the installed firmware. After accomplishing the actions specified by the legacy method, process 400 ends at termination step 470.

On the other hand, if it is determined that the installed firmware has a firmware family control block, process 400 proceeds to acquire the installed firmware family code and installed firmware stepping level from the firmware family control block, as illustrated in step 420. Next, as depicted in decisional step 425, process 400 determines if the candidate, or new, firmware has a firmware family control block. In the event that the candidate firmware does not have a firmware family control block indicating that the candidate firmware is a older legacy firmware, the flash utility should refuse to install the candidate firmware. However, there may be certain occasions where installing a candidate firmware with no firmware family control block over an installed firmware that has one is desired. In these cases, the flash utility may provide a equivalent of a command line override option. If the override option is provided, process 400 proceeds, as illustrated in decisional step 435, to determine if an override has been initiated. If it is determined that an override has been selected, process 400 proceeds to perform the update operation, as illustrated in step 460. Following the completion of the update operation or if it was determined that an override was not selected, process 400 terminates at termination step 470.

However, if it was determined at decisional step 425 that the candidate firmware has a firmware family control block, process 400 proceeds to acquire the candidate firmware's family code and stepping level from the candidate's firmware family control block, as depicted in step 430. After acquiring the candidate firmware's family code and stepping level, process 400 compares the family code and stepping level of the installed and candidate firmwares, as illustrated in decisional step 440. If the firmware family codes of the candidate and installed firmwares do not match, process 400 next determines whether there is a table entry (analogous to table entries 240, 250, 260 in FIG. 2) present in the candidate firmware family control block directing that the candidate firmware's family code and stepping level may replace the installed firmware's family code and stepping level or a table entry present in the installed firmware family control block directing that the installed firmware's family code and stepping level may be replaced by the candidate firmware's family code and stepping level. It should be noted that in the process of evaluating the compatibility table entries, the flash utility will have to access the corresponding relationship codes, including a portion of the relationship codes that indicate how the stepping levels should be compared. If it is determined that there are no table entries in either the installed or candidate firmware family control block allowing the candidate firmware to replace the installed firmware, process 400 proceeds to report, as depicted in step 455, that the firmware images are incompatible and terminates the upgrade operation in termination step 470.

In the event that it was determined in decisional step 440 that the family codes of the installed and candidate firmwares match or if it was determined in decisional step 445 that there was a table entry in either the candidate or installed firmware family control blocks indicating that the candidate and installed firmware images are compatible, process 400 proceeds to check if there is a table entry in either of the candidate or installed firmware family control block that explicitly disallows an upgrade operation, as illustrated in decisional step 450. If, in decisional step 450, process 400 determines that there is a table entry in the candidate firmware family control block that explicitly disallows an update involving the installed firmware family code and stepping level or an entry in the installed firmware family control block that explicitly disallows an update involving the candidate firmware family code and stepping level, process 400 reports that the firmware images are incompatible and terminates the upgrade operation at termination step 470.

However, in the event that it was determined in decisional step 450 that there are no table entries in either of the candidate or installed firmware family control block that explicitly disallows an upgrade operation, process 400 proceeds to perform the upgrade operation, in a advantageous embodiment, by flashing the candidate firmware image over the installed firmware image, as depicted in step 460. Following a successful firmware upgrade, process terminates at termination step 470.

In an advantageous embodiment, the methods for determining compatibility between firmware images and for upgrading an installed firmware with a candidate firmware disclosed by the present invention is implemented as a computer executable software program. As depicted in FIG. 1, the present invention may be implemented within an exemplary data processing unit, e.g., data processing system 100 that may be embodied as a computer workstation platform, such as IBM's RS/6000. It should be noted that although the present invention has been described, in one embodiment, in the context of a computer workstation, those skilled in the art will readily appreciate that the present invention described hereinabove may be implemented, for example, by other suitable electronic module to execute a corresponding sequence of machine-readable instructions. These instructions may reside in various types of signal-bearing media. In this respect, one aspect of the present invention concerns a programmed product, that includes signal-bearing media tangibly embodying a program of machine-readable instructions executable by a digital data processor to perform the processes for determining compatibility and upgrade described above. The present invention does not contemplate limiting its practice to any particular type of signal-bearing media, i.e., computer-readable medium, utilized to actually carry out the distribution. Examples of signal-bearing media includes recordable type media, such as floppy disks, hard disk drives and flash memory, and transmission type media such as digital and analog communication links and wireless.

While the invention has been particularly shown and described with reference to a preferred embodiment, it will be understood by those skilled in the art that various changes in form and detail may be made therein without departing from the spirit and scope of the invention.

What is claimed is:

1. A method for upgrading an installed firmware with a candidate firmware, comprising:

determining if each of said installed and candidate firmwares has a control block, wherein each of said control blocks includes a firmware family code, firmware stepping level and compatibility table of an associated firmware;

acquiring firmware family codes and firmware stepping levels of said installed and candidate firmwares in response to said determination that both of said installed and candidate firmwares have a control block, wherein each said firmware family code uniquely identifies a product family of a firmware image;

comparing said family codes and said stepping levels of said installed and candidate firmwares; and determining if said installed and candidate firmwares are compatible utilizing said compatibility tables in response to said family codes and said stepping levels of said installed and candidate firmwares not matching; and in response to determining that said installed firmware does not have a firmware family control block that includes a firmware family code, firmware stepping level and compatibility table for said installed firmware, causing a flash utility to refuse to install said candidate firmware.

2. The method as recited in claim 1, further comprising overwriting said installed firmware with said candidate firmware in response to said determination that said installed and candidate firmwares are compatible.

3. The method as recited in claim 1, further comprising reporting said installed firmware with said candidate firmware are incompatible in response to said determination that said installed and candidate firmwares are not compatible.

4. The method as recited in claim 1, wherein said compatibility table includes at least one table entry, wherein said table entry is associated with a different firmware.

5. The method as recited in claim 4, wherein said table entry includes a family code and a stepping level of said different firmware.

6. The method as recited in claim 5, wherein said table entry further includes a relationship code that identifies whether a firmware associated with said compatibility table can be utilized to replace a firmware belonging to a firmware family identified in said compatibility table.

7. The method as recited in claim 6, wherein said relationship code includes a family relationship code that identifies which firmware family code is compatible with said firmware associated with said compatibility table.

8. The method as recited in claim 6, wherein said relationship code includes a stepping level relationship code that identifies which stepping levels can replace or be replaced with said firmware associated with said compatibility table.

9. The method as recited in claim 1, further comprising:

in response to determining that said candidate firmware is desired to replace said installed firmware that does not have said firmware family control block, issuing an override command from said flash utility to override said refuse to install command, wherein said candidate firmware flashes over said installed firmware despite said installed firmware lacking said firmware family control block.

10. A computer-readable storage device having stored thereon computer executable instructions for implementing a method for upgrading an installed firmware with a candidate firmware, said computer executable instructions when executed perform the steps of:

determining if each of said installed and candidate firmwares has a control block, wherein each of said control blocks includes a firmware family code, firmware stepping level and compatibility table of an associated firmware;

acquiring firmware family codes and firmware stepping levels of said installed and candidate firmwares in response to said determination that both of said installed and candidate firmwares have a control block, wherein each said firmware family code uniquely identifies a product family of a firmware image, and wherein the product family is defined as a set of products that utilizes a same firmware that allows unrestricted changes from one revision level of said firmware image to another revision level of said firmware image;

comparing said family codes and said stepping levels of said installed and candidate firmwares;

determining if said installed and candidate firmwares are compatible utilizing said compatibility tables in response to said family codes and said stepping levels of said installed and candidate firmwares not matching; and in response to determining that said installed firmware does not have a firmware family control block that includes a firmware family code, firmware stepping level and compatibility table for said installed firmware, causing a flash utility to refuse to install said candidate firmware.

11. The computer-readable storage device as recited in claim 10, wherein said computer executable instructions further comprising utilizing legacy methods for determining if said installed and candidate firmwares are compatible in response to said determination that said installed firmware does not have a control block.

12. The computer-readable storage device as recited in claim 10, wherein said computer executable instructions further comprising overwriting said installed firmware with said candidate firmware in response to said determination that said installed and candidate firmwares are compatible.

13. The computer-readable storage device as recited in claim 10, wherein said computer executable instructions further comprising reporting said installed firmwares with said candidate firmware are incompatible in response to said determination that said installed and candidate firmwares are not compatible.

14. The computer-readable storage device as recited in claim 10, wherein said compatibility table includes at least one table entry, wherein said table entry is associated with a different firmware.

15. The computer-readable storage device as recited in claim 14, wherein said table entry includes a family code and a stepping level of said different firmware.

16. The computer-readable storage device as recited in claim 15, wherein said table entry further includes a relationship code that identifies whether a firmware associated with said compatibility table can be utilized to replace a firmware belonging to a firmware family identified in said compatibility table.

17. The computer-readable storage device as recited in claim 16, wherein said relationship code includes a family relationship code that identifies which firmware family code is compatible with said firmware associated with said compatibility table.

18. The computer-readable storage device as recited in claim 16, wherein said relationship code includes a stepping level relationship code that identifies which stepping levels can replace or be replaced with said firmware associated with said compatibility table.

* * * * *